United States Patent Office 3,445,656
Patented May 20, 1969

---

3,445,656
CURING VINYL MATERIAL USING RHODAMINE AS A CURE INDICATOR
James W. Hull, Long Grove, and Howard Penn, Skokie, Ill., assignors to Morton International, Inc., a corporation of Delaware
No Drawing. Continuation-in-part of application Ser. No. 337,737, Jan. 15, 1964. This application Dec. 23, 1966, Ser. No. 604,117
Int. Cl. G01n 21/38
U.S. Cl. 250—71          10 Claims

ABSTRACT OF THE DISCLOSURE

A vinyl resin curing method in which rhodamine is included in a curable vinyl resin such as a polyvinylchloride plastisol prior to curing. During or after curing, the resin is examined in ultraviolet or other invisible light for a change in color which indicate complete cure; this is usually done by comparing color with that of a similar completely cured standard.

---

This application is a continuation in part of our application Ser. No. 337,737, entitled, Cure Indicator, filed Jan. 15, 1964, now abandoned.

This invention relates to the use of fusion or curing indicators for determining the completion or stage of fusion of a pigmented vinyl material such as vinyl plastisols, organisols, and other compounded vinyls. More particularly, this invention relates to a method for determining such fusion or curing by fluoroescence in the presence of invisible radiation.

In the industrial processing of pigmented vinyl dispersion, such as vinyl plastisols, and organisols, for making molded materials and the like, heating conditions are often difficult to precisely control. Under an assumed set of conditions, the degree of fusion of the vinyl in a finished article may vary significantly. For example, in the rotational casting process for making balls, a multiplicity of aluminum cavities mounted on spindles are filled with a plastisol and closed; the closed cavities are rotated in a heated forced air oven. The circulating air stream does not always heat each cavity uniformly, thus resulting in finished articles which have not been equally heat treated and therefore have differing degrees of cure. Further, changes in the velocity of air and rise and fall in temperature of the oven are unpredictable and may not even be noticed by the operator. Because of these variations, the physical properties of the finished articles often vary. Such variance in physical properties can often result in sufficient finished articles which fall below the acceptable minimum cure standards of the producer. The number of "rejects," of sub-minimal products, may be large and the economic loss can be considerable. Thus, it is desirable to provide some means for indicating the extent to which a plastisol has been cured or fused, at a time when the equipment can be adjusted and the cure can be conveniently continued or discontinued for the elimination of such "rejects."

Another example of the need for controlling fusion is the making of vinyl film. Vinyl film is produced on calenders. If the calender rolls are too hot, the gloss will be too high. If the rolls are too cool, the film will be dull and the physical properties will not be up to standard.

Former responsive cure indicators such as the thermochromatic cure indicators have been used in cure processes to indicate the attainment of a proper curing temperature. However, such indicators show merely the attainment of a proper cure temperature and do not directly indicate a proper cure or state of fusion, especially when the cure must be carried out at the temperature for a period of time. Further, the use of the thermochromatic curing indicators involves the coordination of the indicator and its color change temperature with a curing temperature of a given plastisol, a coordination which may or may not be possible in a given system. It is, therefore, desirable to provide more widely usable curing indicators which directly indicate the proper plastisol cure rather than indicating the attainment of some temperature at which the cure of a specific formulation is possible.

It is a general object of this invention to provide a new and useful method of the nature herein described.

It is further an object of this invention to provide a new and useful method which may be used to determine the degree or completion of fusion of a plastisol by changes in the fluorescence of an indicator in the plastisol when viewed under invisible radiation.

In one aspect of this invention, it is an object to provide such a method in which the product formed by fusing the plastisol is not appreciably affected in appearance under normal visible light conditions by the presence of the indicator.

Other objects of this invention will be apparent to those skilled in the art from the description herein.

The present invention involves the determination of cure or fusion of a fusable vinyl dispersion and may be conducted by adding or mixing a fluorescent Rhodamine dye with the liquid dispersion, subjecting the dispersion to curing conditions and comparing the color change of the fluorescent material under invisible radiation with a control as a determination that the dispersion is fused or cured.

While an illustrative embodiment of the invention will be described in detail herein, the invention is susceptible of embodiment in many different forms, and it should be understood that the present disclosure is to be considered as an exemplification of the principles of the invention and is not intended to limit the invention to the exemplary embodiment disclosed and described.

First, to specifically exemplify this invention, a plastisol of the following composition was obtained.

| Ingredients: | Parts by weight |
|---|---|
| Polyvinyl chloride | 100 |
| Dioctylphthalate | 70 |
| Calcium carbonate | 20 |
| Barium cadmium stabilizer | 2 |
| Antimony oxide | 2 |

Plastisols such as the one above have normal oven curing temperatures in the 250° F. to 750° F. range. To exemplify the curing indication with this plastisol in invisible light, 0.5% by weight of Rhodamine 6GON was added and mixed with the above plastisol formulation prior to curing. The Rhodamines are fluorescent materials which are classified as xanthene dyes. Examples of other Rhodamines are Rhodamine B and Rhodamine S.

The plastisol containing the fluorescent material was heated to a curing temperature of about 350° F. and the plastisol was checked intermittently under ultraviolet light until an appreciable and distinct color change was noticed in the plastisol. When the cure was proper and was discontinued the intensity of the color was noted. The resulting cured plastisol was kept as a standard. Thereafter, other experiments using the same plastisol and Rhodamine dye were conducted and curing was continued until the color change matched the standard. At that time, the cure in each instance was found to be proper. Where cure was discontinued before the proper color was reached, the plastisol was not properly cured. The inclusion of the dye did not cause appreciable change in visible color in any of the cured plastisols.

The method of this invention has been generally described and specifically exemplified above. In an advantageous aspect of the invention, however, the fluorescent material, either dye or pigment, is included in the dispersion in a minor amount, preferably from about 0.001 to about 2% by weight, although smaller or larger amounts can be used. With fluorescent dyes, the amount added will generally be at the lower end of the range while with pigments it generally will be at the upper end of the range. Mixtures of dyes and pigments may fall within or without the range. The amount of fluorescent material will depend, of course, to some extent on the intensity and compatibility of the fluorescent material in the plastisol. However, generally, the fluorescent material may be used in either small or large amounts, as can be determined by those skilled in the art.

Upon preparation of the mix of fluorescent material and vinyl dispersion for use in producing any desired object, a standard should first be prepared. To do this, an amount of the prepared dispersion is cured in the selected mold for a proper time and at the proper temperature to obtain a proper cure. This may be confirmed by tensile strength tests and the like. The properly cured object is then viewed under invisible or ultraviolet light and the color intensity is noted. Thereafter, all objects produced using the dispersion are compared under ultraviolet light with the standard, and if the color is the same, the object will be found to be properly cured. In the alternative, it may be desirable to prepare more than one standard object showing various states of cure and even over-cure so that on comparison of any other objects their state of cure may be readily determined. If the cure is conducted in the presence of substantial amounts of invisible radiation, it may be desirable to take into general account any catalytic or excitation effects that such radiation may have on the cure or on the cured product especially where significant doses of ionizing radiation are used or where a radiation activated catalyst is used, e.g., a catalyst activated by ultraviolet light or gamma rays. However, by correct observation of the cure in accordance herewith, the cure can be followed and completion determined.

As indicated above, the cure conditions for a given plastisol are already well known to the art. For the polyvinylchloride plastisol as specifically exemplified above, we may use, for example, 250° to 750° F. for a period of, for example, 30 seconds to 15 minutes. Cure times and temperatures may be adjusted as is well known to the art.

Although we do not intend to be held to any theories regarding the basis for operability of the present method, it appears that by using fluorescent material in accordance herewith, the intensity of emitted color of a fused plastisol can be made a function of the heat history, including time and temperature of fusion, of the fused dispersion. This apparently holds true when using the fluorescent material with any curable dispersion, although the colors and color changes may vary widely with different dispersions. Thus, with a given formulation, the intensity of emitted fluorescent color can be heightened with increases of either time or temperature of fusion or with increases in both. Also, the formulation can be designed so that, conversely, the intensity of the emitted color will decrease with increase of time or temperature or both. In like manner, the color or shade will depend on the heat history to which the fused plastisol has been subjected. Additionally, the color or shade of the emitted fluorescence of a fused plastisol will depend, as one factor, on the nature and amount of fluorescent substance and the contents of the base plastisol. When the fused plastisol is observed under invisible light, the color change may be detected by the human eye, color recording instruments, color sensitive instruments, or the like, as the determination of the proper cure. Color change is apparently soundly based and dependent on the history of the dispersion leading to proper cure and therefore can be taken as a correct indication of proper cure.

The addition of fluorescent material to the dispersion with subsequent fusion and exposure to ultraviolet light results in an emitted fluorescence which is a blend of the background color of the dispersion and the fluorescence of the fluorescent material. By associating the degree of fusion with a particular shade and/or intensity of fluorescence of the fused dispersion fluorescent material mixture, there is established a "degree of fusion" or fusion indication. A set of color standards may readily be prepared for a given plastisol or variety of plastisols, if desired. Such standards can be prepared by imitation of the color for a desired degree of cure or as a set of standards for various phases of cure. More usually, the standard desired is the standard for complete cure, which standard may be a sample of properly cured dispersion of the same composition and including the same fluorescent material in the same amount as the dispersion to be monitored. As indicated above, detection and comparison with a sample may be made by the human eye or by color responsive instruments, such as a pair of photo-electric cells in a Wheatstone bridge arrangement as known to the art for comparing colors.

It should be apparent from the foregoing that we have provided a method which can be used to monitor production of cured dispersions whereby products from a curing zone may be monitored for proper cure and curing process conditions can be readjusted in accordance with the findings as to proper cure, either manually or by automatic control. The degree of cure may also be monitored or detected if desired and the method is further adaptable for use to determine the cure end point by following or monitoring the cure process continuously or intermittently in the presence of the invisible radiation.

Although a particular plastisol of the polyvinyl chloride type has been specifically exemplified and used above, other fusable polyvinyl chloride dispersions are, of course, usable. Such other dispersions would be produced by variations in the plasticizer, stabilizer, pigment, and/or fillers. For example, plasticizers such as diisodecyl phthalate, aromatic hydrocarbons, tricresyl phosphate, dioctyl azelate and others are usable. In place of barium cadmium stabilizer, lead, tin, zinc, epoxy and epoxy materials and the like may be used. The amounts of these materials and the like amounts of the polyvinyl chloride may be varied widely as is well known in the art to produce acceptable vinyl dispersions. In short, it may be stated that the method of this invention for determining proper fusing may be used widely with vinyl dispersions of all types.

The fluorescent materials commercially available may be used or suitable materials may be produced for use in accordance with known pocedrures. The fluorescent material may be a dye or a pigment or mixture thereof and may have visible color characteristics in visible light where it is desired to incorporate such visible characteristics into the cured product. Preferably, however, the fluorescent material is invisible, i.e., non-appreciable, or of a light, normally undetectable shade or color in the concentration used under visible light so as not to appreciably affect the appearance of the cured dispersion in visible light. The material fluoresces under invisible radiation, e.g., when activated by radiation of proper wave length. The fluorescent materials can be solid or liquid. Preferably, the fluorescent material is compatible with the dispersion in the amounts and under the conditions used and is not totally reactive with the dispersion so as to completely destroy the fluorescent property prior to completion of the cure.

The fluorescent materials are fluorescent in invisible radiation and radiation of proper wave lengths should be used with the particular fluorescent material selected or the fluorescent material selected may be selected on the basis of the invisible radiation available. Although the method has been exemplified with respect to ultraviolet light and although ultraviolet light is a preferred source of invisible radiation, it is to be understood that other forms of invisible radiation may be used. The radiation need only be of a wave length and intensity sufficient to cause detectable fluorescence in the fluorescent material outside of the visible light range.

We claim:

1. The method of determining the proper cure or fusion of a curable vinyl material, which method comprises mixing a minor amount of fluorescent Rhodamine with said curable vinyl material, subjecting the mixture to curing conditions and detecting color change of said Rhodamine under the influence of invisible radiation as a determination of the proper cure.

2. The method of claim 1 wherein said curing conditions are at an elevated temperature in the range of 250-750° F. and for a time normally sufficient to completely cure said vinyl material.

3. The method of claim 2 wherein said vinyl material is a curable polyvinylchloride plastisol.

4. The method of claim 1 wherein said detecting step is by comparing the color of the vinyl material during curing with a color standard under ultra-violet light until the color of the vinyl material matches the color of the standard.

5. The method of claim 4 wherein said color standard is a cured sample of a mixture of the Rhodamine with the same curable vinyl material in the same proportion as is present in the mixture made in said mixing step.

6. The method of claim 4 wherein said comparing is by periodically comparing the color of the curing mixture and that of the standard.

7. The method of claim 1 wherein said Rhodamine is Rhodamine 6GDN.

8. The method of claim 1 wherein said mixture contains from about 0.001 to about 2 percent by weight of Rhodamine.

9. In a method for the manufacture of a plurality of objects from a curable vinyl material wherein each of the objects is subjected to the procedure of claim 1 wherein said detecting step includes comparing the color of each object with a color standard as a determination that the vinyl material has said proper degree of cure, said method including the additional step of recovering objects having the proper degree of cure separate from objects having insufficient cure.

10. The method of claim 9 including the step of subjecting rejected objects having an insufficient fluorescent color change and therefore an insufficient degree of cure to curing conditions for an additional period of time until their color change indicates the proper degree of cure.

References Cited

UNITED STATES PATENTS

| 2,113,090 | 4/1938 | McKeag et al. | 250—80 X |
| 2,671,250 | 3/1954 | Fidell | 250—71 X |
| 3,118,060 | 1/1964 | Klein | 250—71 |

RALPH G. NILSON, *Primary Examiner.*

S. ELBAUM, *Assistant Examiner.*

U.S. Cl. X.R.

19—66; 117—159; 260—92.8